(12) United States Patent
Osafune et al.

(10) Patent No.: US 12,514,834 B2
(45) Date of Patent: Jan. 6, 2026

(54) PHARMACEUTICAL COMPOSITION FOR TREATING AND/OR PREVENTING RENAL CYSTIC CILIOPATHY

(71) Applicants: Kyoto University, Kyoto (JP); NATIONAL UNIVERSITY CORPORATION HOKKAIDO UNIVERSITY, Hokkaido (JP)

(72) Inventors: Kenji Osafune, Kyoto (JP); Shinichi Mae, Kyoto (JP); Saori Nishio, Sapporo (JP); Fumihiko Hattanda, Sapporo (JP)

(73) Assignees: KYOTO UNIVERSITY, Kyoto (JP); NATIONAL UNIVERSITY CORPORATION HOKKAIDO UNIVERSITY, Hokkaido (JP)

( * ) Notice: Subject to any disclaimer, the term of this patent is extended or adjusted under 35 U.S.C. 154(b) by 0 days.

(21) Appl. No.: 19/041,480

(22) Filed: Jan. 30, 2025

(65) Prior Publication Data

US 2025/0170083 A1    May 29, 2025

Related U.S. Application Data

(63) Continuation of application No. PCT/JP2023/038716, filed on Oct. 26, 2023.

(30) Foreign Application Priority Data

Oct. 26, 2022  (JP) ................. 2022-171387

(51) Int. Cl.
| | | |
|---|---|---|
| A61P 13/12 | (2006.01) | |
| A61K 31/192 | (2006.01) | |
| A61K 31/195 | (2006.01) | |
| A61K 31/196 | (2006.01) | |
| A61K 31/203 | (2006.01) | |
| A61K 31/216 | (2006.01) | |
| A61K 31/402 | (2006.01) | |
| A61K 38/17 | (2006.01) | |

(52) U.S. Cl.
CPC .......... *A61K 31/192* (2013.01); *A61K 31/195* (2013.01); *A61K 31/196* (2013.01); *A61K 31/203* (2013.01); *A61K 31/216* (2013.01); *A61K 31/402* (2013.01); *A61K 38/179* (2013.01); *A61P 13/12* (2018.01)

(58) Field of Classification Search
CPC ..... A61P 13/12; A61K 31/203; A61K 31/192; A61K 31/196; A61K 31/402
See application file for complete search history.

(56) References Cited

U.S. PATENT DOCUMENTS

| | | |
|---|---|---|
| 2020/0248148 A1 | 8/2020 | Sueta et al. |
| 2024/0010989 A1 | 1/2024 | Osafune et al. |

FOREIGN PATENT DOCUMENTS

| | | |
|---|---|---|
| WO | 2018/216743 | 11/2018 |
| WO | 2021/075585 | 4/2021 |
| WO | 2022/149616 | 7/2022 |
| WO | 2022/210968 | 10/2022 |

OTHER PUBLICATIONS

Lixi Li et al., "Tamibarotene inhibit the accumulation of fibrocyte and alleviate renal fibrosis by IL-17A", Renal Failure, 2020, vol. 42, No. 1, pp. 1173-1183.
Vicente E. Torres et al., "Tolvaptan in Patients with Autosomal Dominant Polycystic Kidney Disease", The New England Journal of Medicine, 367, Dec. 2012, pp. 2407-2418.
Shin-Ichi Mae et al., "Expansion of Human iPSC-Derived Ureteric Bud Organoids with Repeated Branching Potential", Cell Reports 32, 107963, 2020.
Tsukasa Nakamura et al., "Elevation of Serum Levels of Metalloproteinase-1, Tissue Inhibitor of Metalloproteinase-1 and Type IV Collagen, and Plasma Levels of Metalloproteinase-9 in Polycystic Kidney Disease", Am J Nephrol, 20, 2000, pp. 32-36.
Tomonaga Ameku et al., "Identification of MMP1 as a novel risk factor for intracranial aneurysms in ADPKD using iPSC models", Scientific Reports 6:30013, Jul. 2016, pp. 1-14.
Isaline Rowe et al., "Defective glucose metabolism in polycystic kidney disease identifies a new therapeutic strategy", Nat Med, 19, Mar. 2013, pp. 488-493.
Kazushige Hanaoka et al., "cAMP Regulates Cell Proliferation and Cyst Formation in Autosomal Polycystic Kidney Disease Cells", J Am Soc Nephrol 11, 2000, pp. 1179-1187.
Iram Zafar et al., "Effect of statin and angiotensin-converting enzyme inhibition on structural and hemodynamic alterations in autosomal dominant polycystic kidney disease model", Am J Physiol Renal Physiol 293, Jun. 2007, pp. F854-F859.
Melissa A. Cadnapaphornchai et al., "Effect of Pravastatin on Total Kidney Volume, Left Ventricular Mass Index, and Microalbuminuria in Pediatric Autosomal Dominant Polycystic Kidney Disease", Clin J Am Soc Nephrol, 9, May 2014, pp. 889-896.
International Search Report issued Jan. 9, 2024 in corresponding International Application No. PCT/JP2023/038716.

(Continued)

*Primary Examiner* — Gyan Chandra
(74) *Attorney, Agent, or Firm* — Wenderoth, Lind & Ponack, L.L.P.

(57) ABSTRACT

[Technical Problem]
To provide a pharmaceutical composition for treating and/or preventing renal cystic ciliopathy.
[Solution to Problem] A pharmaceutical composition for treating and/or
preventing renal cystic ciliopathy, the composition comprises a retinoic acid receptor (RAR) agonist is provided.

3 Claims, 13 Drawing Sheets
Specification includes a Sequence Listing.

(56) References Cited

OTHER PUBLICATIONS

Nguyen, Que Thanh Thanh et al., "Synergistic Antiproliferative Effects of All-Trans Retinoic Acid and Paclitaxel on Autosomal Dominant Polycystic Kidney Disease Epithelial Cells", BioMed Research International, vol. 2021, Article ID 1242916, Oct. 2021, pp. 1-12.

Altieri, Paola et al., "N-(4-Hydroxyphenyl) Retinamide Inhibits Cystogenesis by Polycystic Epithelial Cell Lines in Vitro", Life Sciences, vol. 64, Issue 22, 1999, pp. PL259-PL265.

Papadimitriou, Alexandros et al., "Collecting duct cells show differential retinoic acid responses to acute versus chronic kidney injury stimuli", Scientific Reports, vol. 10, Article No. 16683, 2020, pp. 1-12.

Islam, M. Rafiq et al., "Retinoic acid-dependent activation of the polycystic kidney disease-1 (PKD1) promoter", American Journal of Physiology—Renal Physiology, vol. 295, Issue 6, 2008, pp. F1845-F1854.

Mae, Shin-Ichi et al., "Human iPSC-derived renal collecting duct organoid model cystogenesis in ADPKD", Performance Computer Architecture, Cell Reports 42, 113431, 2023.

Caroline Thivierge et al., "Overexpression of PKD1 Causes Polycystic Kidney Disease", Molecular and Cellular Biology, vol. 26, No. 4, Feb. 2006, pp. 1538-1548.

CRL-2830 Product Sheet, WT 9-7, ATCC, Feb. 8, 2024, pp. 1-7.

Olivier Devuyst et al., "Expression of aquaporins-1 and -2 during nephrogenesis and in autosomal dominant polycystic kidney disease", Am. J. Physiol., 271 (1Pt2), Jul. 1996, pp. F169-F183.

Samsca® package insert (with partial English translation), 2022.

Byungdo B. Han et al., "Fenretinide perturbs Focal Adhesion Kinase in Premalignant and Malignant Human Oral Keratinocytes. Fenretinide's chemopreventive mechanisms include ECM interactions", Cancer Prev Res (Phila), 8(5), May 2015, pp. 419-430.

Jinzhao He et al., "Inhibiting Focal Adhesion Kinase Ameliorates Cyst Development in Polycystin-1-Deficient Polycystic Kidney Disease in Animal Model", JASN 32, 2021, pp. 2159-2174.

Carsten Bergmann et al., "Polycystic kidney disease", Nature Reviews, Disease Primers, 2018, pp. 1-24.

Tracy Tran et al., "A scalable organoid model of human autosomal dominant polycystic kidney disease for disease mechanism and drug discovery", Cell Stem Cell 29, 2022, pp. 1083-1101.

International Preliminary Report on Patentability issued Apr. 29, 2025 in International Application No. PCT/JP2023/038716, with English language translation, pp. 1-7.

"Medical Drugs: Amnolake", Amnolake® Tablet 2 mg Package Insert, Oct. 2022 Revision, 1st Edition, with English language translation, pp. 1-12.

"Phase II clinical trial begins for polycystic kidney disease drug candidate identified by iPS cell-based drug discovery", with English translation, https://www.regenephro.co.jp/news/2024-02-29/ and https://www.regenephro.co.jp/en/news/2024-02-29, (2024), pp. 1-25.

"Phase II Clinical Trial Begins for Autosomal Dominant Polycystic Kidney Disease Drug Candidate Identified by iPS Cell-based Drug Discovery", Center for iPS Cell Research and Application, Kyoto University, Feb. 29, 2024, with English language translation, pp. 1-7, https://www.cira.kyotou.ac.jp/j/pressrelease/news/240229-150000.html and https://www.cira.kyotou.ac.jp/e/pressrelease/news/240229-150000.html.

Study Details, Study of Tamibarotene in Patients with ADPKD, National Library of Medicine, National Center for Biotechnology Information, Mar. 4, 2024, https://clinicaltrials.gov/study/NCT06289998, pp. 1-8.

Anroop B. Nair, et al., "A simple practice guide for dose conversion between animals and human", Journal of Basic and Clinical Pharmacy, Mar.-May 2016, vol. 7, issue 2, pp. 27-31.

Extended European Search report issued Nov. 26, 2025 in corresponding European Patent Application No. 23882723.2, 6 pages.

Marijin F. Stokman et al., "Renal Ciliopathies: Sorting Out Therapeutic Approaches for Nephronophthisis", Frontiers in Call and Development Biology, May 13, 2021, vol. 9, Article 653138, pp. 1-30.

[Figure 1]
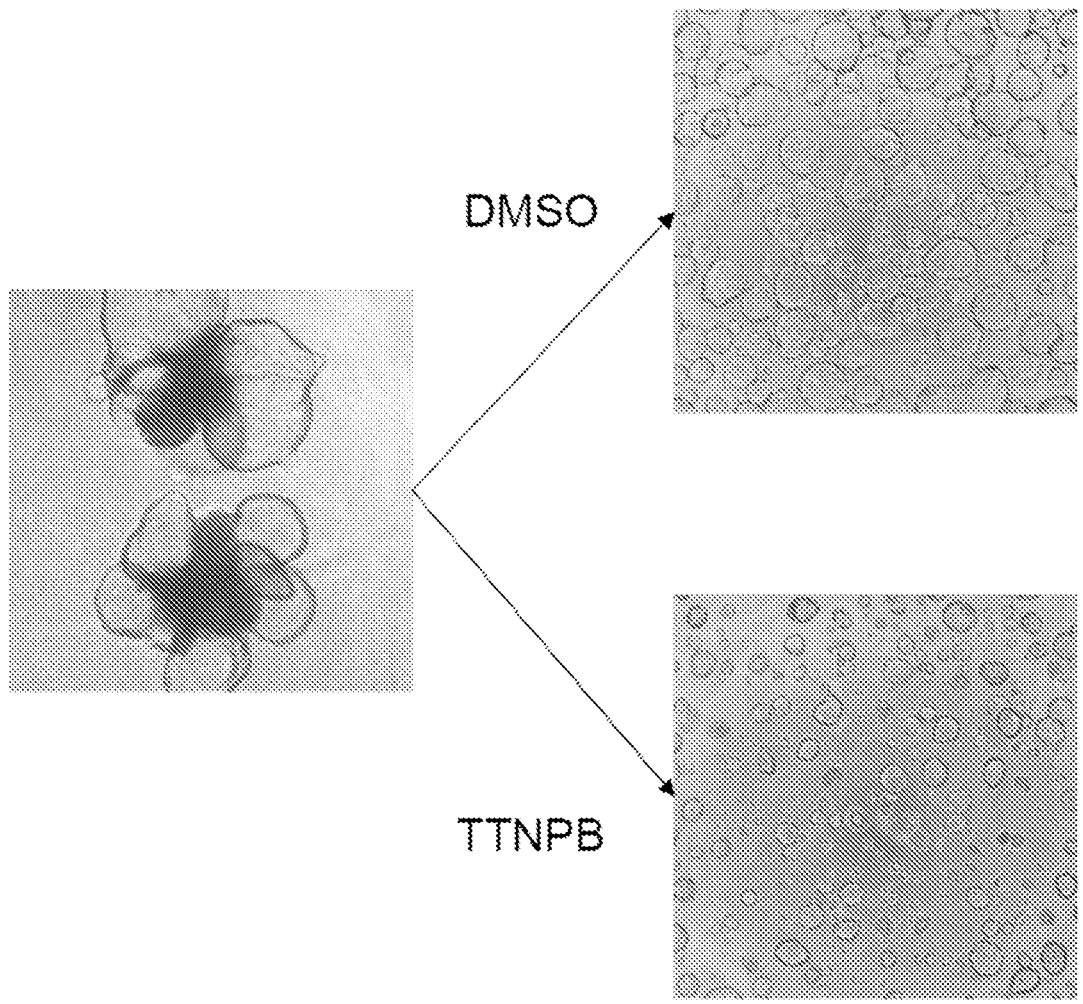

[Figure 2]
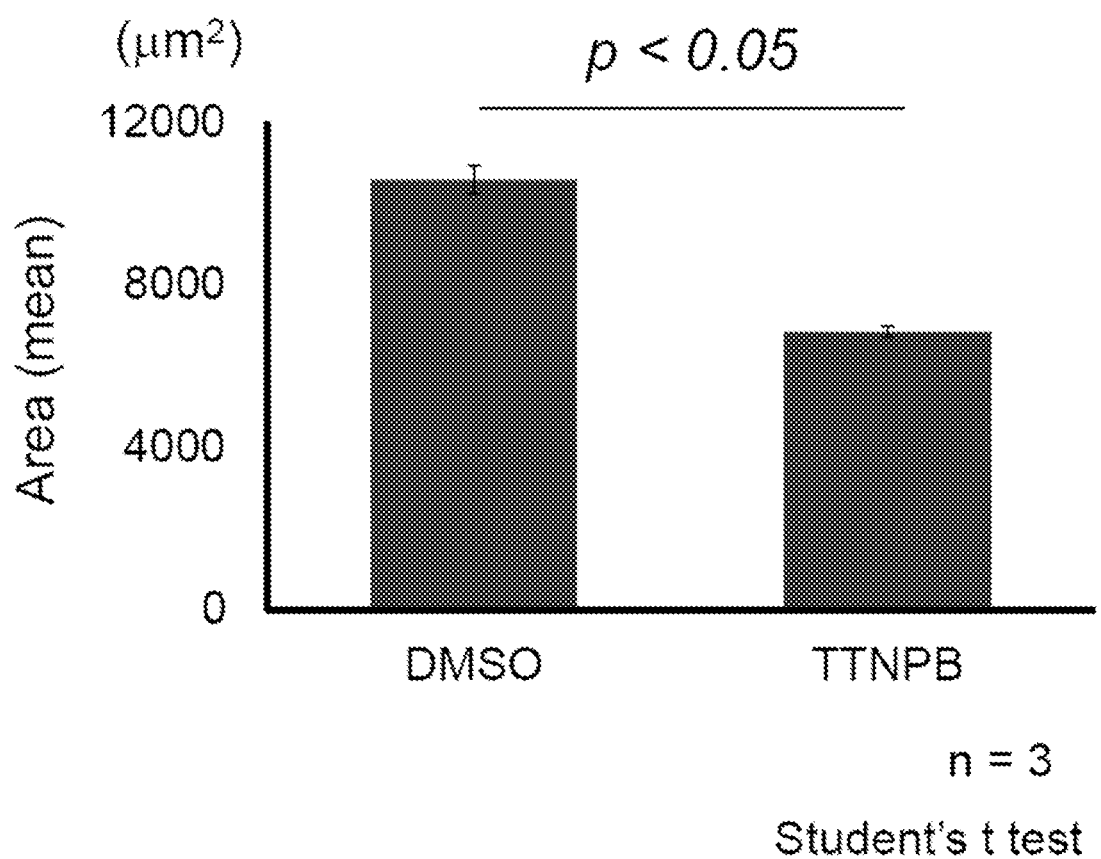

[Figure 3]
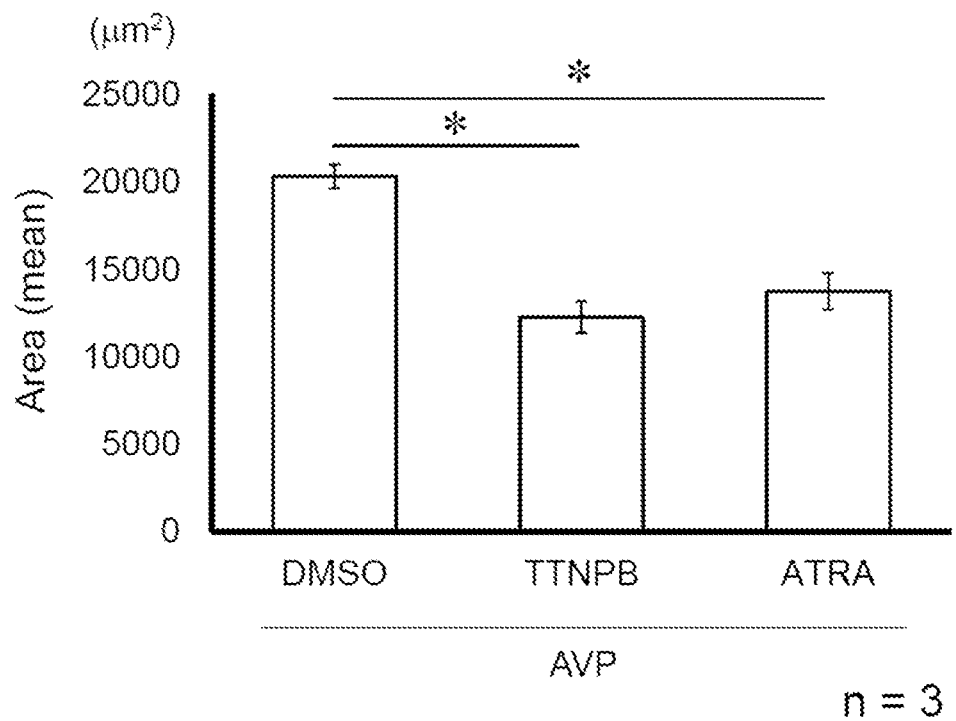
*$p < 0.005$ by one-way ANOVA with Tukey's test
[Figure 4]
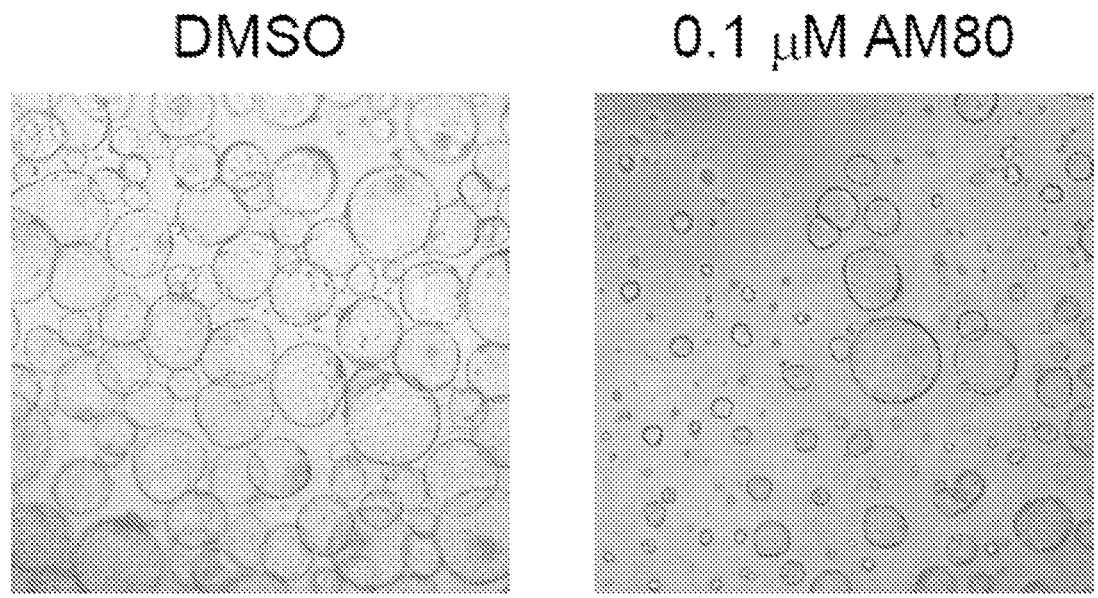

[Figure 5]
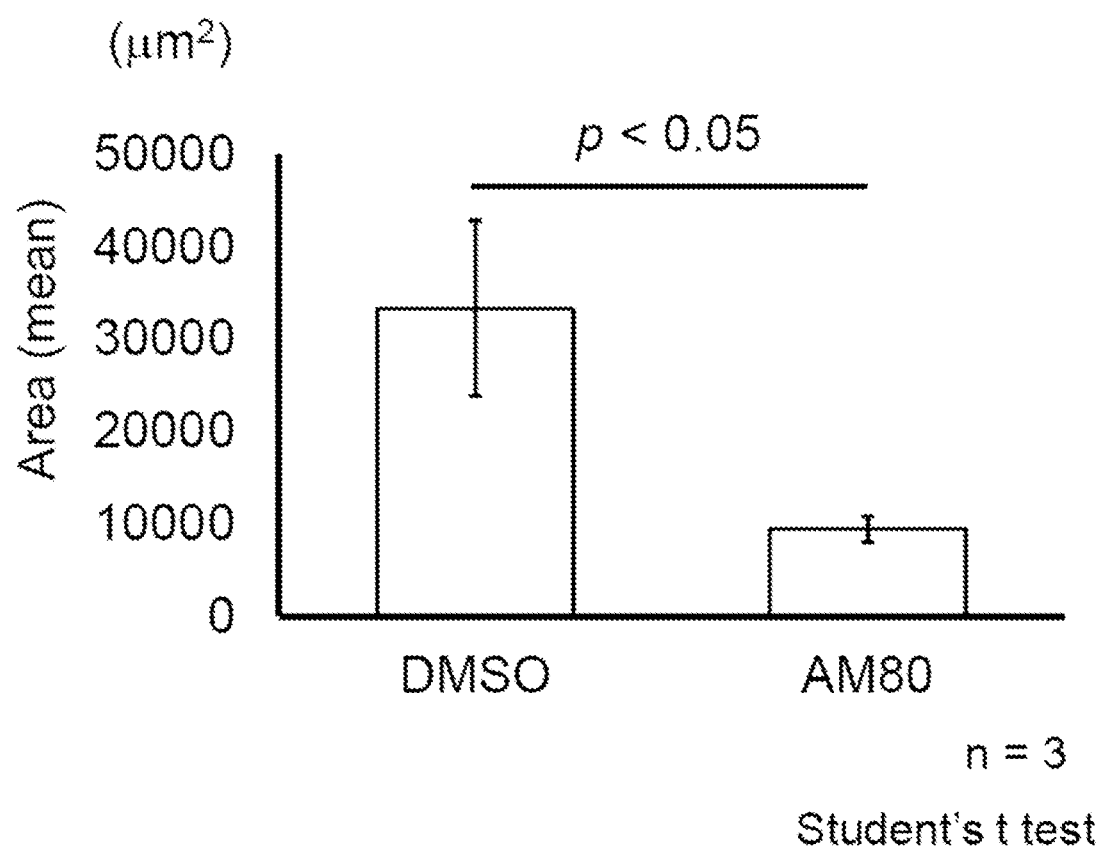

[Figure 6]
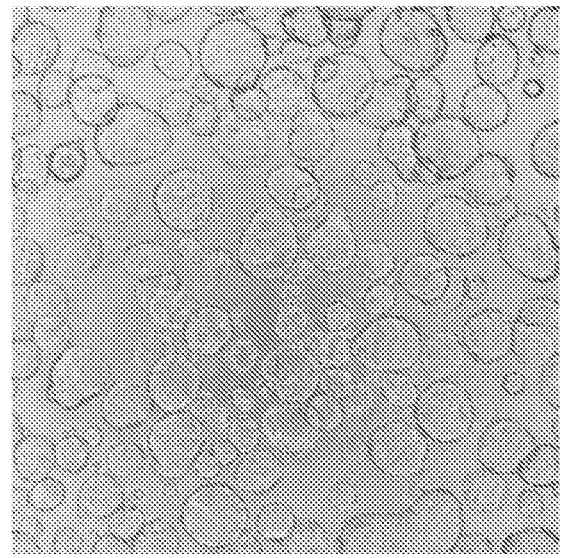
DMSO
 microarray comparison
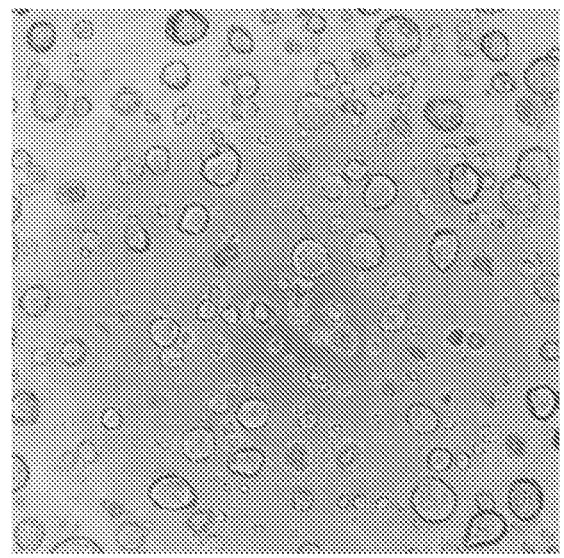
TTNPB

[Figure 7]
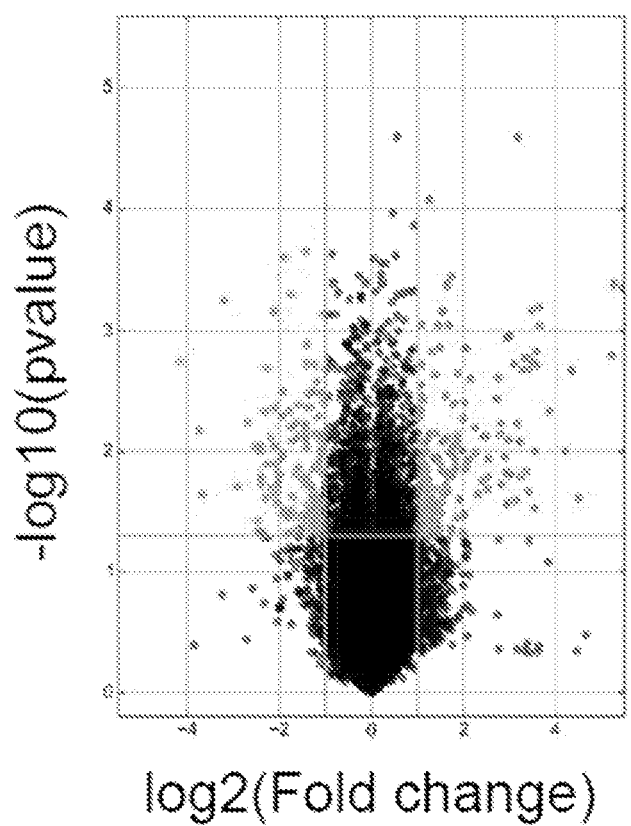

[Figure 8]
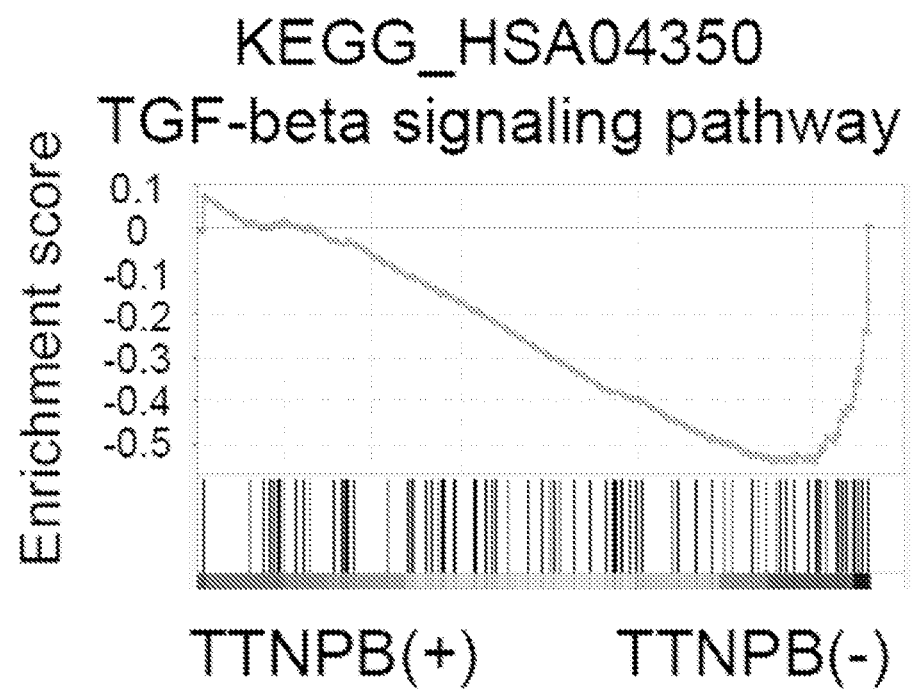

[Figure 9]
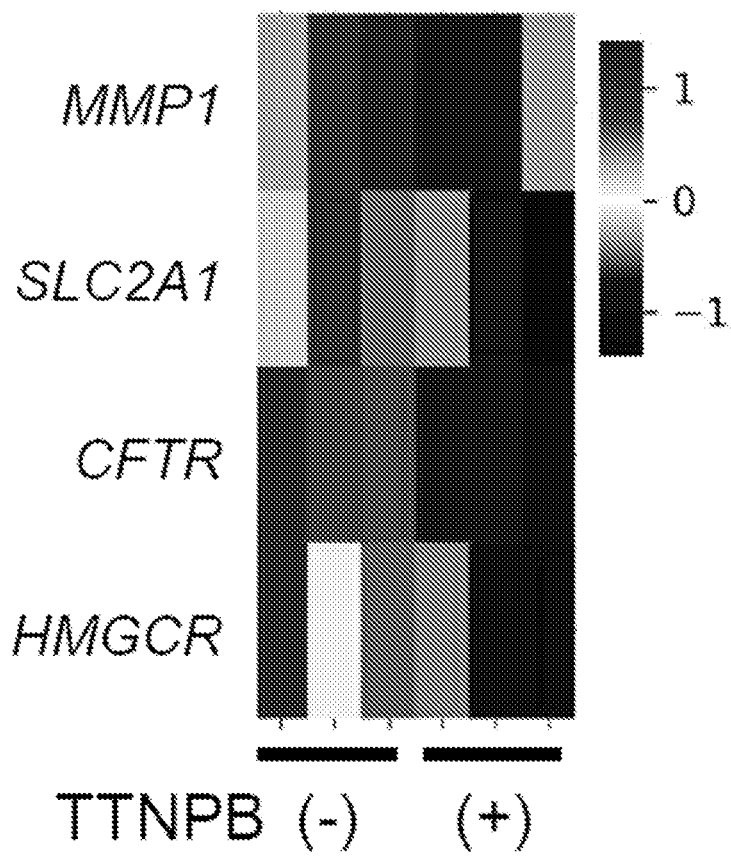
[Figure 10]
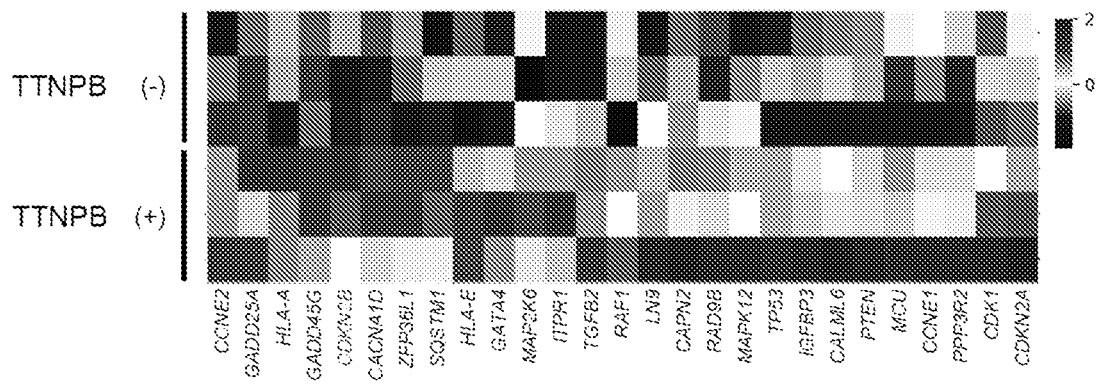

[Figure 11]
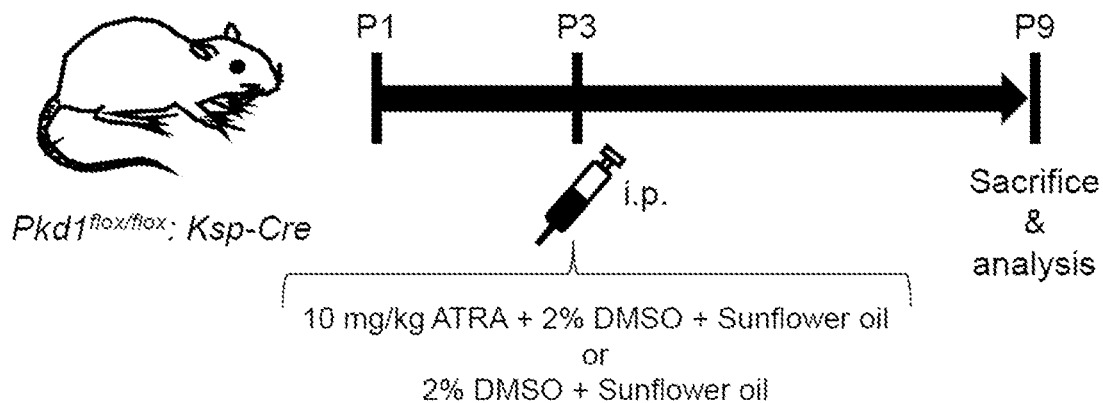
[Figure 12]
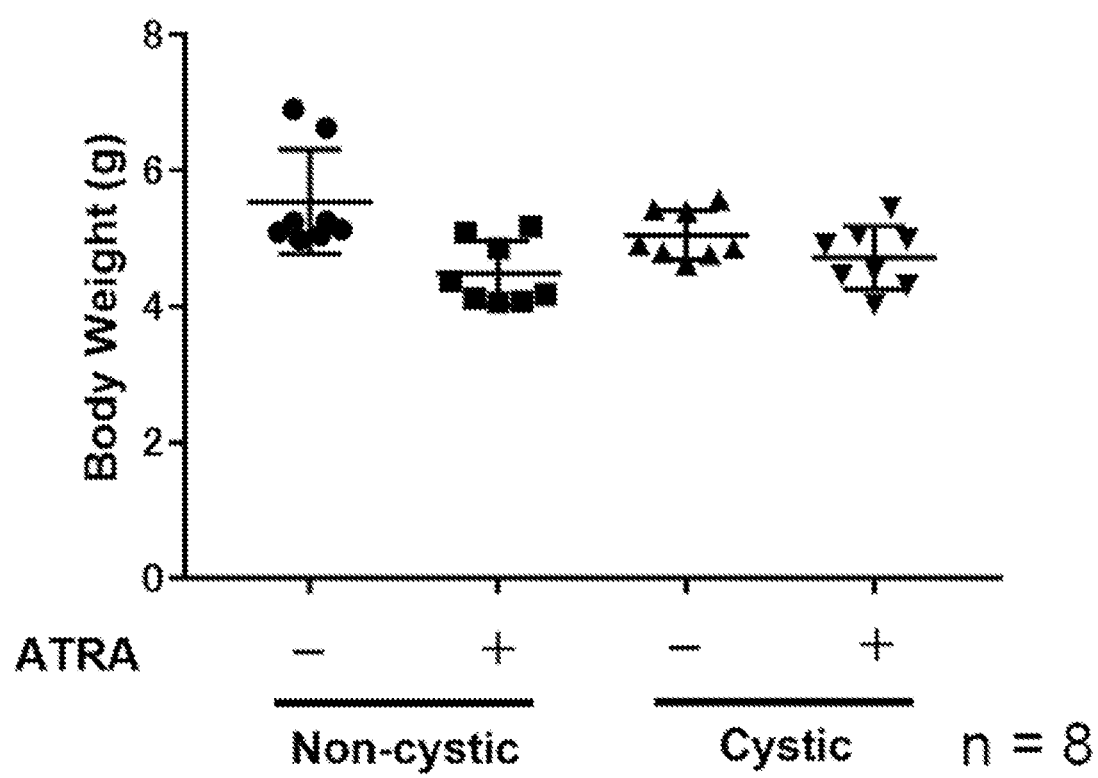

[Figure 13]
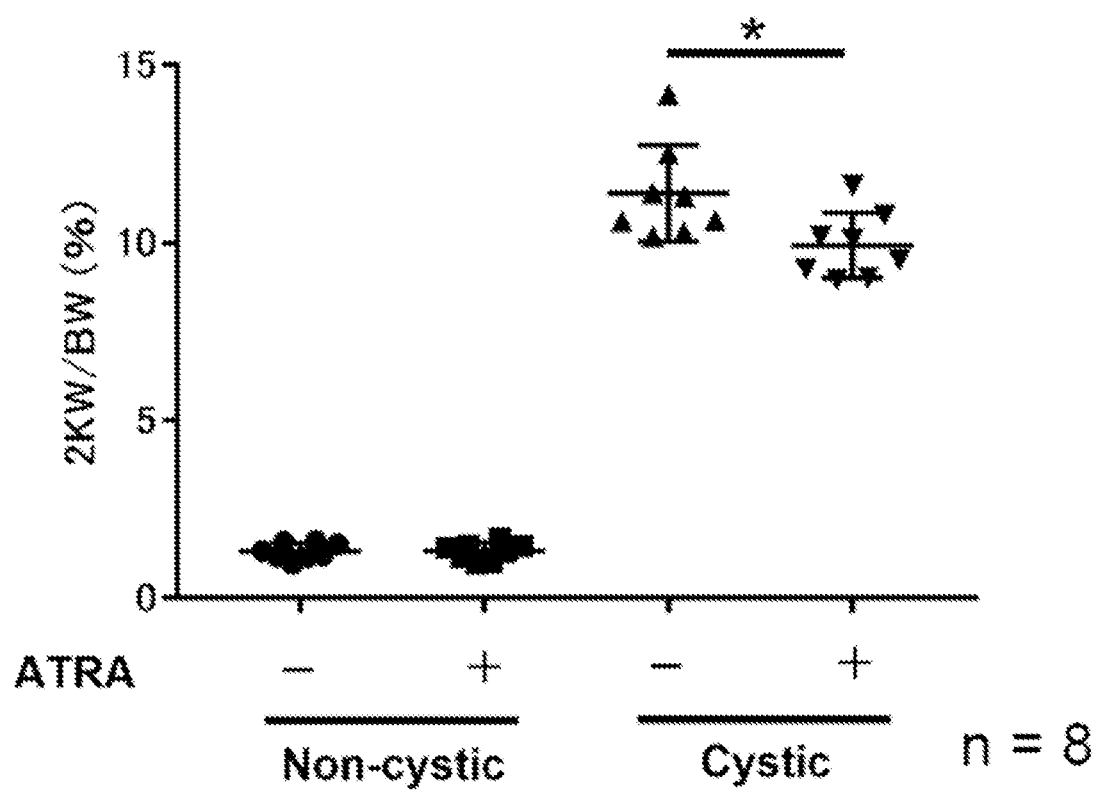

[Figure 14]
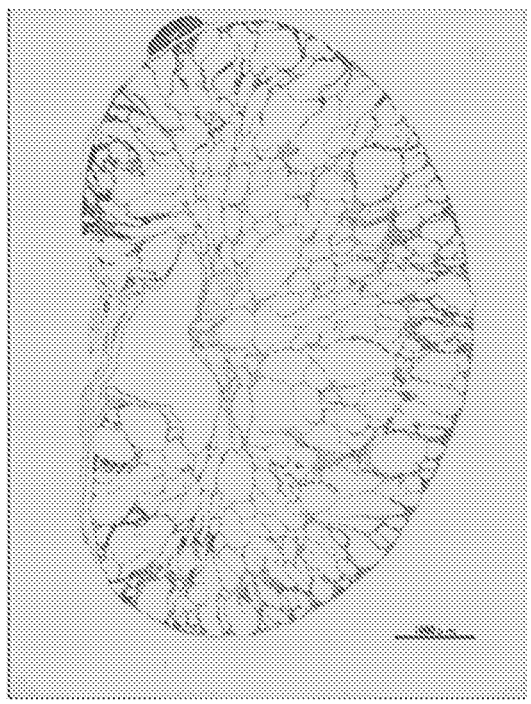 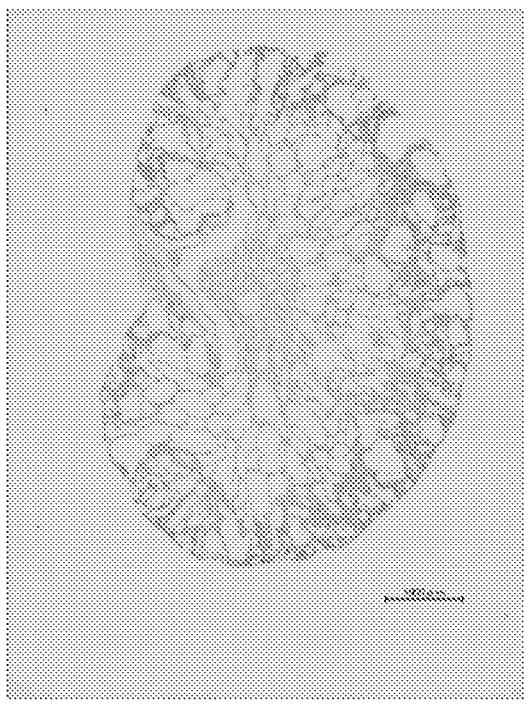

[Figure 15]
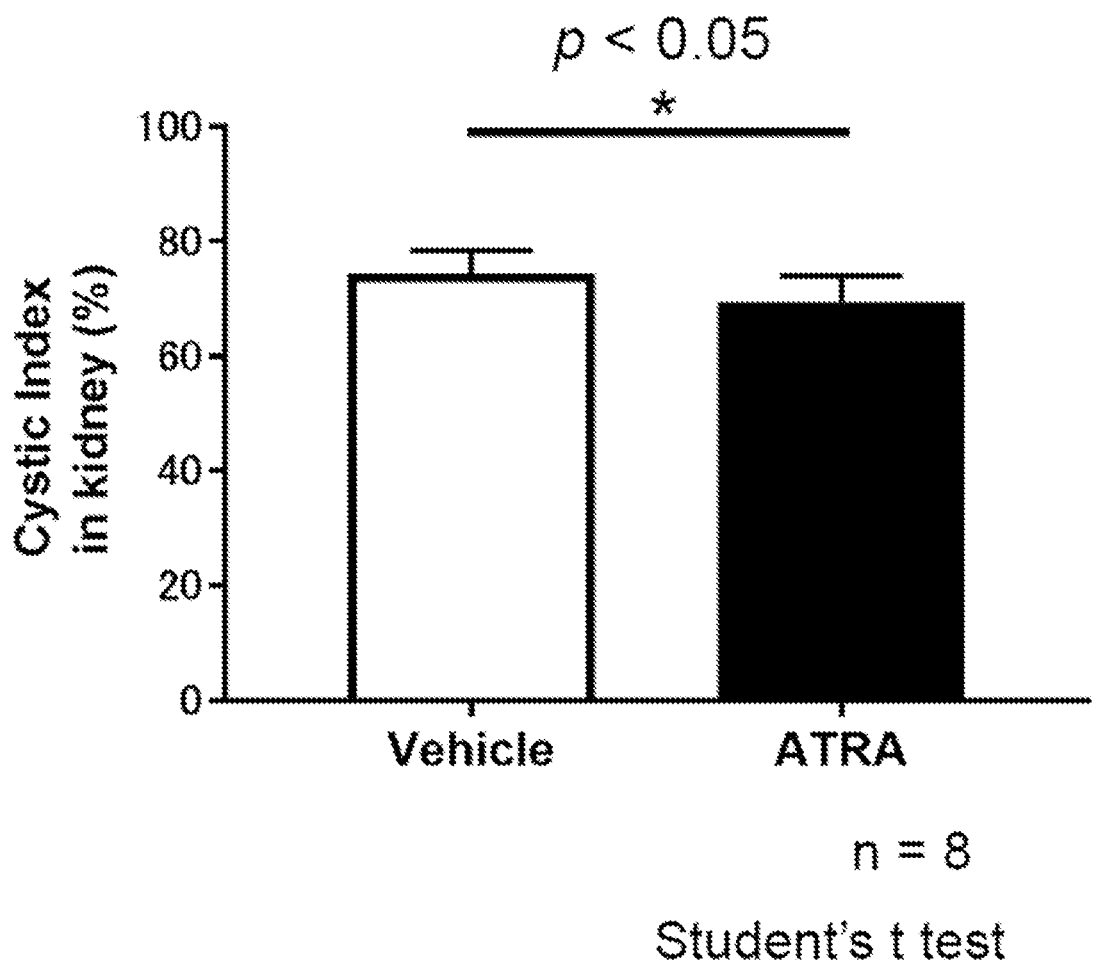

[Figure 16]
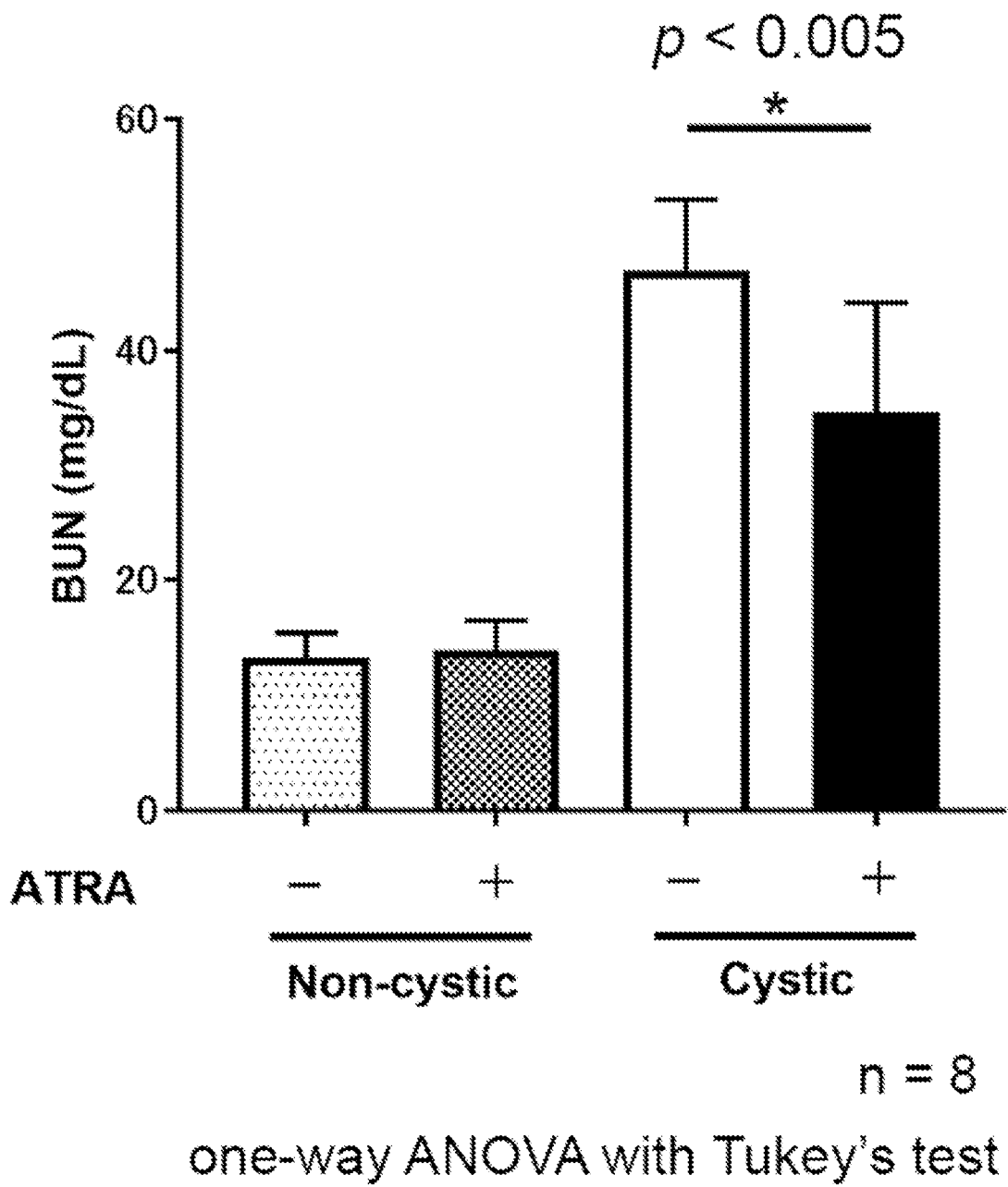

SEQUENCE LISTING

```
Sequence total quantity: 3
SEQ ID NO: 1            moltype = DNA   length = 57
FEATURE                 Location/Qualifiers
source                  1..57
                        mol_type = other DNA
                        organism = synthetic construct
SEQUENCE: 1
gagaccactt ggatccggga tcaggtcttc atctaggttt tagagctaga aatagca      57

SEQ ID NO: 2            moltype = DNA   length = 20
FEATURE                 Location/Qualifiers
source                  1..20
                        mol_type = other DNA
                        organism = synthetic construct
SEQUENCE: 2
cgtccattgt gggtagcaat                                               20

SEQ ID NO: 3            moltype = DNA   length = 20
FEATURE                 Location/Qualifiers
source                  1..20
                        mol_type = other DNA
                        organism = synthetic construct
SEQUENCE: 3
tctctgtctt ctccccagga                                               20
```

PHARMACEUTICAL COMPOSITION FOR TREATING AND/OR PREVENTING RENAL CYSTIC CILIOPATHY

TECHNICAL FIELD

The present application relates to a pharmaceutical composition for treating and/or preventing renal cystic ciliopathy.

BACKGROUND ART

Autosomal dominant polycystic kidney disease (ADPKD), an intractable genetic disease, progressively forms numerous cysts in the kidneys and progresses to end-stage renal failure in midlife or later. The causative genes for ADPKD are PKD1 in 85% of cases and PKD2 in 15% of cases. Studies have been conducted using experimental animals such as disease model mice and rats, in which these genes have been altered, but the complete pathogenesis has not been elucidated, nor therapies to effect radical cure been developed. Tolvaptan, the only clinically approved and used vasopressin V2 receptor antagonist, inhibits cyst enlargement and renal hypofunction, but has limited efficacy and is not a radical cure (Non Patent Literature 1). In addition, patients who take tolvaptan are subject to various behavioral restrictions, such as the need for frequent fluid intake to prevent the development of side effects such as dehydration and hypernatremia due to its strong diuretic effect, so there is a need to develop a radical therapeutic agent that improves patients' quality of life.

In recent years, research has been actively conducted to analyze the detailed pathology and search for therapeutic agents by generating iPS cells from the somatic cells of patients with intractable diseases or disease-specific iPS cells by introducing mutations into the causative genes of iPS cells derived from healthy individuals, and inducing the differentiation of these cells into the affected cell types in vitro, so as to prepare disease models that reproduce the pathology.

CITATION LIST

Non Patent Literature

[Non Patent Literature 1]
Torres V E et al., N Engl J Med. 2012 Dec. 20; 367 (25): 2407-2418.

SUMMARY OF INVENTION

Technical Problem

An object of the present application is to provide a pharmaceutical composition for treating and/or preventing renal cystic ciliopathy.

Solution to Problem

The present application provides a pharmaceutical composition for treating and/or preventing renal cystic ciliopathy, the composition comprises a retinoic acid receptor (RAR) agonist.

Effects of Invention

The present application provides a pharmaceutical composition for treating and/or preventing renal cystic ciliopathy, the composition comprising a retinoic acid receptor (RAR) agonist.

The present inventors have generated for the first time an in vitro renal collecting duct cyst model from iPS cells, and thus have discovered a pharmaceutical composition for treating and/or preventing renal cystic ciliopathy by using the model.

BRIEF DESCRIPTION OF DRAWINGS

FIG. 1 shows the shapes of cysts on day 5 of culture in the absence (upper right image) or the presence (lower right image) of 0.1 μM TTNPB.

FIG. 2 shows the cyst sizes after treatment with 2.5 μM AVP and 0.1% DMSO or 0.1 μM TTNPB. Data from three independent experiments are presented as mean±s.d. (n=3). Student's t-test was performed.

FIG. 3 shows the cyst sizes after treatment with 2.5 μM AVP and 0.1% DMSO, 0.1 μM TTNPB or 0.1 μM ATRA. Data from three independent experiments are presented as mean±s.d. (n=3). One-way layout analysis of variance with Tukey's test was performed, and * indicates p<0.005.

FIG. 4 shows the shapes of cysts cultured in the absence (left image) or the presence (right image) of 0.1 μM AM80.

FIG. 5 shows the cyst sizes after treatment with 0.1 μM AM80. Data from three independent experiments are presented as mean±s.d. (n=3). Student's t-test was performed.

FIG. 6 is a schematic diagram showing microarray comparison of cysts on day 5 of culture in the absence (top image) or presence (bottom image) of 0.1 μM TTNPB.

FIG. 7 is a volcano plot showing DEGs in cysts cultured in the absence or presence of TTNPB, as evaluated by microarray.

FIG. 8 is a GSEA plot of the TGFβ signaling pathway.

FIG. 9 is a heat map showing DEGs between cysts cultured in the absence or presence of TTNPB, as evaluated by microarray.

FIG. 10 is a heat map showing that the expression of cellular senescence genes was increased by TTNPB, as evaluated by microarray.

FIG. 11 is a schematic diagram for administering ATRA to ADPKD model mice by intraperitoneal injection.

FIG. 12 shows the body weights of mice administered with or without ATRA. Data are presented as mean±s.d. (n=8). A one-way layout analysis of variance with Tukey test was performed and there were no significant differences. Non-cystic: Pkd1$^{flox/-}$:Ksp-Cre, Cystic: Pkd1$^{flox/flox}$:Ksp-Cre (ADPKD model).

FIG. 13 shows the ratio of two kidney weights (2KW) to the body weight (BW). Data are presented as mean±s.d. (n=8). One-way layout analysis of variance with Tukey test was performed, and * indicates p<0.01.

FIG. 14 shows the cross sections of cystic kidneys from P9 Pkd1$^{flox/flox}$:Ksp-Cre mice administered with or without ATRA. Scale bar indicates 1 mm.

FIG. 15 shows the cystic index indicating the severity of PKD in P9 Pkd1$^{flox/flox}$:Ksp-Cre mice after treatment with a solvent (DMSO and sunflower oil) alone or with a solvent containing ATRA. Data are presented as mean±s.d. (n=8). Student's t-test was performed and * indicates p<0.05.

FIG. 16 shows the BUN levels of P9 Pkd1$^{flox/flox}$:Ksp-Cre mice treated with or without ATRA. Data are presented as mean±s.d. (n=8). One-way layout analysis of variance with Tukey test was performed, and * indicates p<0.005. Non-cystic: Pkd1$^{flox/+}$:Ksp-Cre mice, Cystic: Pkd1$^{flox/flox}$:Ksp-Cre mice.

DESCRIPTION OF EMBODIMENTS

In this disclosure, when a numerical value is accompanied by the term "about", it is intended to include the range of ±10% of that value. For example, "about 20" shall include "18 to 22". The numerical range includes all numerical values between the two endpoints and the numerical values at both endpoints. The term "about" for range applies to both endpoints of that range. For example, "about 20 to 30" shall include "18 to 33".

Pharmaceutical Composition

The present application provides a pharmaceutical composition for treating and/or preventing renal cystic ciliopathy, the composition containing a retinoic acid receptor (RAR) agonist.

Ciliopathies are diseases caused by genetic mutations in primary cilia and related structures. Renal cystic ciliopathy refers to a ciliopathy complicated by renal cysts. Examples of the renal cystic ciliopathy include polycystic kidney diseases such as autosomal dominant polycystic kidney disease (ADPKD, also known as "autosomal manifest polycystic kidney disease") and autosomal recessive polycystic kidney disease (ARPKD, also known as "autosomal latent polycystic kidney disease"), nephronophthisis, Joubert syndrome, Barday-Biedl syndrome, Meckel-Gruber syndrome, oral-facial-digital syndrome type I, June syndrome, Senor-Lorken syndrome, and Alstrom syndrome. In one embodiment, the renal cystic ciliopathy is, for example, polycystic kidney disease and is preferably autosomal dominant polycystic kidney disease (ADPKD).

The Retinoic Acid Receptor (RAR) agonist is not particularly limited, as long as it is a substance that binds to and activates RARs. Examples of the RAR agonist include 4-[(E)-2-(5,6,7,8-tetrahydro-5,5,8,8-tetramethyl-2-naphthalenyl)-1-propenyl]benzoic acid (TTNPB, CAS No: 71441-28-6), all-trans retinoic acid (ATRA, CAS No: 302-79-4), 9-cis-retinoic acid (also known as: alitretinoin, CAS No: 5300-03-8), 13-cis-retinoic acid (also known as: isotretinoin, CAS No: 4759-48-2), AM80 (also known as: tamibarotene, CAS No: 94497-51-5), AM580 (CAS No: 102121-60-8), AC261066 (CAS No: 870773-76-5), AC55649 (CAS No: 59662-49-6), AGN-190168 (also known as: tazarotene, CAS No: 118292-40-3), tazarotenic acid (CAS No: 118292-41-4), AGN-195183 (CAS No: 367273-07-2), BMS641 (CAS No: 369364-50-1), BMS753 (CAS No: 215307-86-1), BMS961 (CAS No: 185629-22-5), CD271 (also known as: adapalene, CAS No: 106685-40-9), CD437 (CAS No: 125316-60-1), CD1530 (CAS No: 107430-66-0), CD2314 (CAS No: 170355-37-0), CD5789 (also known as: trifarotene, CAS No: 895542-09-3), Ch55 (CAS No: 110368-33-7), etretinate (CAS No: 54350-48-0), and acitretin (CAS No: 55079-83-9) as well as a pharmaceutically acceptable salt thereof and a pharmaceutically acceptable hydrolyzable ester thereof. In one embodiment, the RAR agonist is AM80. In another embodiment, the PAR agonist is TTNPB. In another embodiment, the RAR agonist is ATRA The term "pharmaceutically acceptable salt" refers to a salt that is not significantly toxic and can be used as a medicine. An example of the pharmaceutically acceptable salt is a base addition salt or an acid addition salt. Examples of the base addition salt include: alkali metal salts such as sodium salts, potassium salts, and lithium salts; alkaline earth metal salts such as calcium salts and magnesium salts; metal salts such as aluminum salts and iron salts; inorganic salts such as ammonium salts; organic amine salts such as t-octylamine salts, dibenzylamine salts, morpholine salts, glucosamine salts, ethylenediamine salts, N-methylglucamine salts, guanidine salts, diethylamine salts, triethylamine salts, dicyclohexylamine salts, N,N'-dibenzylethylenediamine salts, chloroprocaine salts, procaine salts, diethanolamine salts, N-benzylphenethylamine salts, piperazine salts, tetramethylammonium salts, and tris(hydroxymethyl)aminomethane salts; and amino acid salts such as glycine salts, lysine salts, arginine salts, ornithine salts, glutamic acid salts, and aspartic acid salts. Examples of the acid addition salt include: mineral acid salts such as hydrochlorides, sulfates, and nitrates; and organic acid salts such as methanesulfonates, paratoluenesulfonates, citrates, and oxalates.

The term "pharmaceutically acceptable hydrolyzable ester" refers to an ester that is hydrolyzed in vivo and includes those that are decomposed readily in the human body to release the parent compound or a salt thereof. Pharmaceutically acceptable hydrolyzable esters may be cleaved by esterases in vivo to give active compounds. Examples of pharmaceutically acceptable hydrolyzable esters include lower alkyl esters, lower alkenyl esters, lower alkylamino lower alkyl esters, acylamino lower alkyl esters, acyloxy lower alkyl esters, aryl esters, and aryl lower alkyl esters. The term "lower" means, for example, 1 to 6 or 1 to 4 carbon atoms.

Pharmaceutically acceptable hydrolyzable ester groups can also be derived, for example, from pharmaceutically acceptable aliphatic carboxylic acids (including alkanoic acids, alkenoic acids, cycloalkanoic acids, and alkanedioic acids). The alkyl or alkenyl group of the pharmaceutically acceptable aliphatic carboxylic acid may have, for example, 6 or less carbon atoms. Specific examples of hydrolyzable esters include formates, acetates, phosphates, propionates, butyrates, acrylates, and succinates.

The pharmaceutical composition of the present application can contain a pharmaceutically acceptable carrier or additive. Examples of such carriers or additives include isotonic agents, thickeners, sugars, sugar alcohols, preservatives, bactericides, antibacterial agents, pH adjusters, stabilizers, chelating agents, oil base agents, gel base agents, wetting agents, surfactants, suspending agents, binding agents, excipients, lubricants, disintegrants, foaming agents, fluidizing agents, dispersing agents, emulsifying agents, buffers, dissolution aids, and antioxidants. Pharmaceutically acceptable carriers or additives may be used singly or in a mixture of two or more.

The route of administration of the pharmaceutical composition of the present application is not particularly limited, including oral or parenteral administration. Various known forms of administration can be employed depending on a target disease. For example, parenteral administration may be systemic or local administration, and examples thereof include intratracheal administration, intravenous administration, intraarterial administration, intraportal administration, intradermal administration, subcutaneous administration, intramuscular administration, intraperitoneal administration, intranasal administration, and oral administration. In a preferred embodiment, when the subject is an animal, the pharmaceutical composition of the present application is administered intraperitoneally or orally. In a preferred embodiment, when the subject is a human, the pharmaceutical composition of the present application is administered orally.

Examples of the oral dosage forms include granules, fine granules, powder agents, coated tablets, tablets, suppositories, dispersions, capsules, microcapsules, chewables, liquids, suspensions, and emulsions. As the dosage form for administration by injection, general dosage forms of pharmaceutical preparations such as preparations for intravenous injection, preparations for intracoronary administration, preparations for drip administration, and preparations for prolonging the release of active substances can be employed. Injectable forms of administration may be provided in sealed ampules or vials, or as lyophilized products that only require the addition of a sterile liquid (e.g., water for injection) immediately before use. Injectable solutions or suspensions may be prepared from powder, granules or tablets. These dosage forms are produced by formulation according to the usual methods.

The dosage and frequency of administration of the pharmaceutical composition of the present application can be set adequately by a person skilled in the art according to animal species to be subjected to administration, the health condition, age, body weight, route of administration, and form of administration, etc., of a subject of administration, so that the effective amount of the active ingredient is administered to the subject. For example, the pharmaceutical composition of the present application can be administered once to several times a day, or once to several times a day or few days or a week or few weeks, such as once a week to four weeks, for example. However, examples thereof are not limited thereto. The effective dose in a given situation can be readily determined by routine experimentation and is within the skill and judgment of the ordinary clinician. For example, if the PAR agonist is TTNPB, about 0.001 to about 100 mg/kg body weight, about 0.01 to about 100 mg/kg body weight, about 0.05 to about 10 mg/kg body weight, or about 0.1 to about 5 mg/kg body weight of the RAR agonist can be administered orally. For example, if the RAR agonist is ATRA, about 0.1 to about 1,000 mg, about 1 to about 1,000 mg, about 10 to about 500 mg, about 50 to about 100 mg, or about 60 to 80 mg per day of the RAR agonist can be administered orally. For example, if the PAR agonist is 9-cis-retinoic acid, about 0.1 to about 1,000 mg, about 1 to about 1,000 mg, about 5 to about 100 mg, about 10 to about 50 mg, or about 30 mg per day of the RAR agonist can be administered orally. For example, if the PAR agonist is 13-cis-retinoic acid, about 0.001 to about 50 mg/kg body weight, about 0.01 to about 50 mg/kg body weight, about 0.05 to about 10 mg/kg body weight, about 0.1 to about 5 mg/kg body weight, or about 0.5 to about 1 mg/kg body weight per day of the PAR agonist can be administered orally. For example, if the RAR agonist is AM80, about 0.01 to about 100 mg/m$^2$, about 0.1 to about 100 mg/m$^2$, about 0.5 to about 50 mg/m$^2$, about 1 to about 10 mg/m$^2$, or about 6 mg/m$^2$ per day of the RAR agonist can be administered orally.

The pharmaceutical composition of the present application may be used alone or in combination with one or more further active ingredients. Further active ingredients are, for example, active ingredients for treating and/or preventing renal cystic ciliopathy. The expression "used in combination" means not only the use of dosage form containing all ingredients and the combined use of dosage forms containing each ingredient separately, but also the simultaneous or sequential administration of each ingredient, or delayed administration of any ingredient, as long as they are used for treating and/or preventing renal cystic ciliopathy. Two or more further active ingredients may be used in combination.

As used herein, the term "treatment" means, in a subject with a disease, to reduce or eliminate the cause of the disease, to delay or halt the progression of the disease, to reduce, alleviate, ameliorate, or eliminate its symptoms, and/or to inhibit the worsening of its symptoms.

As used herein, the term "prevention" means to prevent the onset of a disease or reducing the likelihood of developing the disease in a subject. Here, disease onset includes recurrence. The subject is, for example, a subject who is likely to develop a disease but has not yet done so. Subjects who may develop renal cystic ciliopathy but have not yet done so include, for example, subjects with genetic predisposition to the renal cystic ciliopathy. Examples of genetic predisposition to the renal cystic ciliopathy include gene mutations in the causative genes for ADPKD (PKD1 and PKD2, etc.), the causative genes for ARPKD (e.g. PKHD1), the causative genes for nephronophthisis (NPHP1 to NPHP13, etc.), the causative genes for Joubert syndrome (JBTS1 to JBTS17, etc.), the causative genes for Bardet-Biedl syndrome (BBS1 to BBS15, etc.), the causative genes for Meckel-Gruber syndrome (MKS1 to MKS10, etc.), the causative genes for oral-facial-digital syndrome type I (e.g. OFD1), the causative genes for Jeune syndrome (e.g. IFT80), the causative genes for Senior-Loken syndrome (NPHP1, NPHP3 to NPHP6, etc.), or the causative genes for Alstrom syndrome (e.g. ALMS1).

Examples of subjects for treatment and/or prevention of the disease include mammals such as mice, rats, hamsters, guinea pigs, cattle, horses, pigs, sheep, monkeys, orangutans, chimpanzees, dogs, cats, and humans, preferably primates, and more preferably humans.

Method for Treatment

The present application also provides a method for treating renal cystic ciliopathy, which involves administering the pharmaceutical composition of the present application to a subject in need thereof. The present application also provides the use of an RAR agonist for the manufacture of the pharmaceutical composition for treating renal cystic ciliopathy. The present application further provides an RAR agonist for use in the treatment of renal cystic ciliopathy. Examples of renal cystic ciliopathy and the RAR agonist are as described above.

Method for Prevention

The present application also provides a method for preventing renal cystic ciliopathy, which involves administering the pharmaceutical composition of the present application to a subject in need thereof. The present application also provides the use of the RAR agonist for the manufacture of the pharmaceutical composition for preventing renal cystic ciliopathy. The present application further provides the RAR agonist for use in the prevention of renal cystic ciliopathy. Examples of the renal cystic ciliopathy and the RAR agonist are as described above.

EXAMPLES

The following examples are provided for further description, but the present invention is not limited to these examples in any way.

[Materials and Methods]

Preparation of PKD1 Knockout Induced Pluripotent Stem (iPS) Cells

Experiments using human induced pluripotent stem cells were approved by the Ethics Committee of the Faculty of Medicine and Graduate School of Medicine, Kyoto University. The 1383D2 cell line was used as a human iPS cell line. PKD1 knockout iPS cells were prepared using the CRISPR-Cas9 regulated transcription and nuclear shuttling (CRONUS) system based on a previously reported DNA transposon (Ishida K. et al, Sci Rep. 8: 310 (2018); Shimizu T. et al., Biochem Biophys Res Commun. 529, 1186-1194 (2020)). Cells were continuously transfected with a CRO-NUS-Puro vector (pPV-TetO-SphcCas9-GR-iC-A-EF1α-rtTA-iP, Addgene ID 100596) and a piggyBac vector for cloning sgRNA (pPV-H1-ccdB-mEF1α-RiH, Addgene ID 100598) together with a piggyBac transposase expression plasmid (pHL-EF1α-hcPBase-A, Addgene ID 100599) through lipofection using FuGENE6 (Promega). The CRONUS-Puro vector and the piggyBac vector for cloning sgRNA were compatible with puromycin selection and hygromycin selection, respectively. The following sequence: 5'-GAGACCACTTGGATCCGG-GATCAGGTCTTCATCTAGGTTT-TAGAGCTAGAAATAGCA-3' (SEQ ID NO: 1, the target site is underlined) was used to clone the gRNA sequence targeting the PKD1 exon 34 splicing acceptor site into the pPV-H1-ccdB-mEF1α-RiH vector. RFP+ colonies were manually harvested by drug selection of transfected cells and treated with doxycycline and dexamethasone to induce genome editing. Individual colonies were screened for in terms of genome editing efficiency by Sanger sequencing of bulk genomic DNA. Single cells were then isolated by flow cytometry, clonally grown in 24-well culture plates (Corning) coated with iMatrix-511 (Nippi), and then genotyped by Sanger sequencing. Genome editing resulted in the generation of frameshifts and immature termination codons. Two bases (AG) at different sites within exon 34 functioned as splicing acceptor sequences, resulting in the generation of two types of PKD1 mutant mRNA. The primer sequences used in this example are listed in Table 1.

TABLE 1

| Primers | Sequence | |
|---|---|---|
| PKD1 exon34 | CGTCCATTGTGGGTAGC AAT SEQ ID NO: 2 | TCTCTGTCTTCTCCCCA GGA SEQ ID NO: 3 |

Induction of PKD1 Knockout iPS Cells into Ureteric Bud Organoids

PKD1 knockout iPS cells were induced to differentiate into ureteric bud organoids as previously described (Mae, SI. & Ryosaka, M. et al. Cell Reports 32, 107963, 2020).

Preparation of Ureteric Bud Tip Cells

Ureteric bud organoids derived from PKD1 knockout iPS cells were treated with Accutase (Innovative Cell Technologies) at 37° C. for 5 minutes and then dissociated into single cells by pipetting. Cells were suspended in DMEM/F12 medium (Gibco) containing B27 supplement (vitamin A-free) (Gibco), 3 μM CHIR99021 (StemRD), 0.1 μM TTNPB (Santa Cruz), 200 ng/ml FGF1 (R&D systems), 100 ng/ml GDNF (R&D systems), 10 μM Thiazovivin (Santa Cruz Biotechnology), and 1 μM A83-01 (Wako). Single cells were seeded at $1.0 \times 10^5$ cells/well into each well of a 48-well plate coated with 150 μL of hydrogel. The hydrogel was composed of DMEM/F12 medium containing 50% Matrigel (BD Biosciences) and was allowed to solidify for 1 hour at 37° C. before use. Single cells established ureteric bud tip cell colonies after 7 days. The medium was exchanged every 2 to 3 days.

Subculture of Ureteric Bud Tip Cells

The hydrogel was dissolved with Cell Recovery Solution (Corning) for 30 minutes at 4° C., and then ureteric bud tip cell colonies were isolated. After further washing with Cell Recovery Solution at 4° C. for 30 minutes, ureteric bud tip cell colonies were centrifuged at 500 g for 5 minutes at room temperature. Ureteric bud tip cell colonies were treated with Accutase at 37° C. for 5 minutes and then dissociated into single cells by pipetting. Cells were suspended in DMEM/F12 medium containing B27 supplement (vitamin A-free), 3 μM CHIR99021, 0.1 μM TTNPB, 200 ng/ml FGF1, 100 ng/ml GDNF, 10 μM Thiazovivin and 1 μM A83-01. Cells were seeded at $1.0 \times 10^5$ cells/well into each well of a 48-well plate coated with 150 μL hydrogel. The hydrogel was composed of DMEM/F12 medium containing 50% Matrigel and allowed to solidify for 1 hour at 37° C. before use. Ureteric bud tip cell colonies were prepared by culturing single cells at 37° C. with 5% $CO_2$ for 7 days. The medium was exchanged every 2 to 3 days. The prepared ureteric bud tip cell colonies were passaged every 7 days in the same manner. The tip cell colonies cultured for 4 to 6 weeks or longer were used to reconstitute the following collecting duct organoids.

Reconstitution of Collecting Duct Organoids from Ureteric Bud Tip Cells

The hydrogel was dissolved using Cell Recovery Solution at 4° C. for 30 minutes, so as to isolate ureteric bud tip cell colonies. After further washing with Cell Recovery Solution at 4° C. for 30 minutes, the ureteric bud tip cell colonies were centrifuged at 500 g for 5 minutes at room temperature. Ureteric bud tip cell colonies were treated with Accutase at 37° C. for 5 minutes and then dissociated into single cells by pipetting. Cells were suspended in Essential 6 medium (Gibco) containing 3 μM CHIR99021, 0.1 μM TTNPB, 200 ng/ml FGF1, 100 ng/ml GDNF, 10 μM Thiazovivin and 1 μM A83-01. Cells were seeded at $5.0 \times 10^3$ cells/well into 96-well low-adhesion plates (Sumitomo Bakelite). Single cells were cultured for 2 days at 37° C. with 5% $CO_2$, thereby preparing spheroids.

Spheroids were suspended in Essential 6 medium containing 10% Afamin/Wnt3a conditioned medium (MBL), 200 ng/ml R-spondin 1 (R&D systems), 0.1 μM LDN193189 (Axon medchem), 200 ng/ml FGF1, 200 ng/ml FGF8 (Peprotech), 100 ng/ml GDNF, 0.1 μM TTNPB, 50 ng/ml EGF (R&D systems), 1 μM A83-01 and 10% Matrigel, and then distributed in 35 mm low-adhesion dishes (Sumitomo Bakelite) at 2.5 to 3 mL/dish. The medium was exchanged every 3 to 4 days. Spheroids were cultured at 37° C. with 5% $CO_2$ for 14 to 21 days, thereby preparing artificial collecting duct organoids.

RNA Sequencing Analysis

RNA sequence library preparation, sequencing, mapping and gene expression analysis were performed at DNAFORM. The quality of total RNA was evaluated using a Bioanalyzer (Agilent Technologies) and the RNA Integrity Number was confirmed to be 7.0 or greater. After enrichment of poly (A)+RNA by the use of the NEBNext Poly (A) mRNA Magnetic Isolation Module (New England BioLabs), Double-stranded cDNA libraries (RNA-seq library) were prepared according to the manufacturer's instructions using a SMARTer Stranded Total RNA Seq Kit v2 Pico Input Mammalian (Clontech). RNA-seq libraries were sequenced using paired-end reads (50 nt read 1 and 25 nt read 2) on a NextSeq 500 system (Illumina). The obtained reads were mapped to the human GRCh38 genome using STAR (version 2.7.2b) or Hisat2 (version 2.1.0). Reads of annotated genes were counted using featureCounts (version 1.6.1). FPKM and TPM values were calculated from the mapped reads by normalization with total counts. Differentially Expressed Genes (DEGs) were detected using the DESeq2 package (version 1.26.0). The list of DEGs detected by DESeq2 was used for GSEA. Heat maps and volcano plots were created using the bioinfokit package (version 2.0.1).

Microarray Analysis

For comprehensive profiling of transcripts encoding human proteins, microarray analysis was performed at Filgen using the Human 8×60K LncRNA expression array (ArrayStar). Labeling of samples and array hybridization were performed according to the Agilent One-Color Microarray-Based Gene Expression Analysis protocol (Agilent Technology). Data were collected using Agilent's Feature Extraction software. Raw signal intensities were normalized using the quantile normalization method of GeneSpring GX v12.1. Statistically significantly differentially expressed mRNAs between two groups were extracted by volcano plotting, followed by heat mapping and GSEA analysis.

Animal Model

Pkd1$^{flox/flox}$:Ksp-cre mice, which are ADPKD model mice, develop numerous cysts progressively after birth and die at approximately 14 days of age due to renal failure.

Mouse lineages were maintained with heterozygous Pkd1$^{flox/+}$:Ksp-Cre mice, and Pkd1$^{flox/flox}$:Ksp-cre mice were generated by mating mice of the same lineage.

ATRA Treatment

On postnatal day 3, Pkd1$^{flox/flox}$:Ksp-cre mice (Cystic) and Pkd1$^{flox/+}$:Ksp-Cre mice (Non-cystic) were intraperitoneally administered with ATRA (Sigma, #R2625) dissolved in sunflower oil containing 2% DMSO (solvent) to achieve a dose of 10 mg/kg. A group of mice administered with only the solvent intraperitoneally was served as a negative control. Mice were euthanized on postnatal day 9, and renal tissues and blood samples were collected.

Measurement of BUN (Blood Urea Nitrogen)

BUN in mouse serum was measured using an UN-L kit (Serotec, #A667-00).

Measurement of Hematoxylin-Eosin (HE) Staining and Cystic Index

Kidneys were fixed in 4% paraformaldehyde solution, and 4 μm-thick paraffin sections were prepared. After deparaffinization, HE staining was performed and renal tissues were photographed under an optical microscope. Cystic index was calculated by total cystic area/total renal tissue area× 100 using image analysis and measurement software (WinROOF, Mitani Corporation).

Results

Examination of Compounds that Inhibit Cyst Enlargement

Using PKD1 knockout iPS cells of the 1383D2 cell line, artificial collecting duct organoids with cystic structures were induced by the above method. The following protocol was used to examine compounds that inhibit cyst enlargement.

1. Organoids in which cyst formation was occurring were collected in tubes.
2. Medium was removed and 2 ml of Cell Recovery Solution was added. (4° C., 30 minutes)
3. Gel was dissolved by gentle pipetting with a P-1000 pipetteman and then centrifuged. (500 g, 2 minutes)
4. After removing the supernatant from 3 and adding 5 ml of FBS-containing medium (STO medium), cysts were separated from the organoids by pipetting.
5. Using a stereomicroscope, cysts were collected in 15 ml tubes.
6. The supernatant was removed, and then 2 ml of Accutase was added to perform treatment at 37° C. for 5 minutes.
7. Cells were dissociated down to single cells by pipetting with a P-1000 pipetteman.
8. After filtering, cells were counted.
9. After cell counting, a cell suspension containing the required number of cells was transferred to a tube, and then 5 ml of FBS-containing medium (STO medium) was added to stop the Accutase reaction. To seed at $5\times10^4$ cells/well, the amount of the cell suspension required was calculated.
10. Pellets were prepared by centrifugation (200 g, 5 minutes).
11. The supernatant was thoroughly removed, and then DMEM/F12+B27 w/o V.A. medium (10% Afamin/Wnt3a CM, 200 ng/ml R-Spondin 1, 200 ng/ml FGF1, 10 μM Forskolin, 2.5 μM AVP, 10 μM Y27632) was added for suspension. To seed at $5\times10^4$ cells/well, the amount of medium required was calculated.
12. The cell suspension from 11 was seeded at $5\times10^4$ cells/well into pre-prepared 50% Matrigel plates. The cell suspension was added slowly to avoid disrupting the Matrigel.
13. Cyst structures were prepared by culturing cells at 37° C. with 5% $CO_2$ for 2 days.
14. The medium was removed, and DMEM/F12+B27 w/o V.A. medium was supplemented with 200 ng/ml FGF1 and 2.5 μM AVP, followed by 3 days of culturing at 37° C. with 5% $CO_2$.
15. Nine (9) locations inside the wells were photographed using a 4× objective lens under a fluorescence microscope (Keyence, BZ-X700), the cyst area was measured using a BZ-X Analyzer, and then the average value was calculated.

Cyst enlargement-inhibiting compounds to be evaluated in step 14 were added. TTNPB (Santa cruz, #sc-203303), AM80 (Cyman, #CAY-71770) and ATRA (Sigma, #R2625) were added to achieve a dose of 0.1 μM.

The effects of TTNPB, a potent Retinoic Acid Receptor (RAR) agonist, were examined as a cyst enlargement-inhibiting compound. FIG. 1 shows the photographs of the shapes of cysts on day 5 of culture in the absence (upper right image) or presence (lower right image) of 0.1 μM TTNPB. FIG. 2 shows the results of quantifying the sizes of these cysts. TTNPB treatment demonstrated a significant reduction in cyst size.

TTNPB is an analogue of all-trans retinoic acid (ATRA). ATRA treatment also reduced the cyst sizes (FIG. 3).

Next, the effects of AM80 (Tamibarotene) were examined as a cyst enlargement-inhibiting compound.

FIG. 4 shows the photographs of the shapes of cysts cultured in the absence (left image) or presence (right image) of 0.1 μM AM80. The photographs of the cyst forms in FIG. 4 demonstrate that AM80 reduced the cyst sizes. FIG. 5 shows the results of quantifying the sizes of these cysts. It was demonstrated that AM80 significantly reduced the cyst sizes. These results suggest that the retinoic acid receptor (RAR) agonists have the effect of inhibiting cyst enlargement.

Mechanism of Action of TTNPB

To clarify the mechanism of action of TTNPB, gene expression in cyst cells cultured with and without TTNPB was compared by microarray (FIGS. 6 and 7). In FIG. 7, the gray plot on the right side shows genes that were 2 or more folds differentially expressed in cyst cells cultured in the presence of TTNPB, and the gray plot on the left side shows genes that were 2 or more folds differentially expressed in cyst cells cultured in the absence of TTNPB. Gene set enrichment analysis (GSEA) results revealed that the "TGFβ signaling pathway," an important pathway for cyst enlargement and fibrosis, had been inhibited by TTNPB (FIG. 8).

The heat map revealed that the expression levels of MMP1, SLC2A1, CFTR, and HMGCR were decreased by TTNPB (FIG. 9). The following is known for each gene: MMP1 is secreted at high levels in the blood of ADPKD patients (Nakamura T. et al., Am J Nephrol 2000; 20:32-36; Ameku T. et al., Sci Rep 6: 30013 (2016)); decreased glucose uptake into cells through SLC2A1 reduces energy production by the glycolytic system, inhibiting cyst enlargement (Rowe I. et al., Nat Med 2013: 488-493); CFTR-mediated secretion of cystic fluid causes cyst enlargement (Hanaoka K. & Guggino W B., J Am Soc Nephrol 11: 1179-1187, 2000); HMG-CoA reductase inhibitor (statin) inhibits cyst enlargement (Zafar I. et al., Am J Physiol Renal Physiol 293: F854-F859, 2007; Cadnapaphornchai M A. et al., Clin J Am Soc Nephrol 9: 889-896, 2014). Thus, the results indicate that TTNPB suppressed the expression of these genes associated with cyst enlargement.

Furthermore, the heatmap revealed that TTNPB promotes the expression of cellular senescence marker genes such as CDKN2B (p15) (FIG. 10). This result is consistent with reports that cellular senescence inhibits the progression of ADPKD.

These results indicate that retinoic acid agonists such as TTNPB and ATRA inhibit the enlargement of collecting duct cysts. The results also suggest that retinoid signaling is one of the mechanisms that inhibit cyst enlargement.

Therapeutic effects of ATRA on ADPKD model mice Since ATRA has already been used as a therapeutic agent for Acute Promyelocytic Leukemia (APL) patients, the efficacy of ATRA in ADPKD model mice was examined from a drug repositioning perspective. To reflect the in vitro results of ATRA on collecting duct cyst enlargement in in vivo, $Pkd1^{flox/flox}$:Ksp-Cre mice, in which the Pkd1 allele is conditionally inactivated under expression of kidney-specific Ksp-Cre recombinase in the distal nephron segments and collecting ducts, were used. The mice develop renal failure from birth due to progressive cyst formation and die about 2 weeks after birth. Because Ksp cadherin is specifically expressed in the collecting ducts and distal tubules, cysts originating from the collecting ducts and distal tubules are formed in these ADPKD model mice. ATRA was administered at 10 mg/kg intraperitoneally to mice on postnatal day 3 (P3), and mice were then sacrificed at P9 (FIG. 12).

No significant body weight loss due to ATRA treatment was observed, suggesting no significant side effects from ATRA (FIG. 12). On the other hand, the ratio of kidney weights to body weight (2KW/BW) was significantly decreased when ATRA had been administered to ADPKD model mice (FIG. 13).

Next, renal tissue sections were evaluated by hematoxylin-eosin (HE) staining (FIG. 14). ATRA treatment suppressed the increase in kidney size and tended to inhibit cyst formation on the cortical side. The proportion (cystic index) of the area occupied by cysts in the renal tissue was significantly reduced by ATRA treatment (FIG. 15).

ADPKD model mice exhibited elevated BUN (blood urea nitrogen) levels, an indicator of renal failure, and renal failure occurred. The BUN levels in mice treated with ATRA were significantly lower than those in control mice treated with a solvent (FIG. 16). This result indicates that ATRA treatment inhibited the progression of renal failure.

These results demonstrated that ATRA inhibits cyst enlargement in collecting ducts and distal tubules in the in vivo ADPKD model. ATRA was demonstrated to exhibit therapeutic effects on both in vitro and in vivo ADPKD models.

What is claimed is:

1. A method for treating autosomal dominant polycystic kidney disease (ADPKD) in a subject in need thereof, comprising administering at least one retinoic acid receptor (RAR) agonist selected from the group consisting of 4-[(E)-2-(5,6,7,8-tetrahydro-5,5,8,8-tetramethyl-2-naphthalenyl)-1-propenyl]benzoic acid (TTNPB) and tamibarotene (AM80), and pharmaceutically acceptable salts thereof, and pharmaceutically acceptable hydrolyzable esters thereof.

2. The method according to claim 1, wherein the RAR agonist is at least one selected from the group consisting of tamibarotene (AM80), a pharmaceutically acceptable salt thereof and a pharmaceutically acceptable hydrolyzable ester thereof.

3. The method according to claim 1, wherein the RAR agonist is at least one selected from the group consisting of TTNPB, a pharmaceutically acceptable salt thereof, and a pharmaceutically acceptable hydrolyzable ester thereof.

* * * * *